United States Patent
Amico et al.

(10) Patent No.: US 12,394,267 B2
(45) Date of Patent: Aug. 19, 2025

(54) COMMON TRAINING WORKSTATION AND RELATED METHOD OF USE

(71) Applicant: GREENFIT BRO S.R.L., Palermo (IT)

(72) Inventors: Giorgio Amico, Palermo (IT); Marco Angelo Romano, Palermo (IT); Enrico Michele Giambarresi, Palermo (IT)

(73) Assignee: GREENFIT BRO S.R.L., Palermo (IT)

( * ) Notice: Subject to any disclaimer, the term of this patent is extended or adjusted under 35 U.S.C. 154(b) by 135 days.

(21) Appl. No.: 18/258,365

(22) PCT Filed: Jan. 21, 2022

(86) PCT No.: PCT/IB2022/050502
§ 371 (c)(1),
(2) Date: Jun. 20, 2023

(87) PCT Pub. No.: WO2022/157677
PCT Pub. Date: Jul. 28, 2022

(65) Prior Publication Data
US 2024/0038008 A1 Feb. 1, 2024

(30) Foreign Application Priority Data
Jan. 25, 2021 (IT) .......................... 102021000001295

(51) Int. Cl.
*G07C 9/00* (2020.01)
(52) U.S. Cl.
CPC ..... *G07C 9/00912* (2013.01); *G07C 9/00571* (2013.01); *G07C 9/00817* (2013.01)
(58) Field of Classification Search
CPC ............ G07C 9/00912; G07C 9/00571; G07C 9/00817; G07C 9/00896; G06Q 10/063;
(Continued)

(56) References Cited

U.S. PATENT DOCUMENTS 5,575,742 A * 11/1996 Wu ..................... A63B 23/0211
482/52
10,092,791 B2 * 10/2018 Donnelly ........... A63B 21/0726
(Continued)

FOREIGN PATENT DOCUMENTS

WO WO-2020076532 A1 * 4/2020 ........... A61B 5/6801

OTHER PUBLICATIONS

International Search Report issued May 19, 2022, in corresponding International Application No. PCT/IB2022/050502, 3 pages.

*Primary Examiner* — Nam V Nguyen
(74) *Attorney, Agent, or Firm* — Maier & Maier, PLLC (57) ABSTRACT

A common training workstation including: one or more removable sport equipment, a cabinet provided with a door and with housings for the removable sport equipment, an electronic lock capable of opening/closing the door in response to an opening/closing command, a control unit operatively connected to the electronic lock to send the opening command in response to a request for access by a user, and a plurality of sensors adapted to detect the presence of removable sports equipment within the respective housings. The control unit is configured to send the closing command to the electronic lock when the control unit has received an exit request from the user and each of the sensors detects the presence of the respective removable sport equipment within the respective housing. The embodiments also relate to a method for using the training workstation.

10 Claims, 5 Drawing Sheets

(58) Field of Classification Search
CPC ............... G06Q 10/08; A63B 21/0552; A63B
21/0726; A63B 2209/08; A63B 71/0036;
A63B 2071/0625; A63B 2071/0627;
A63B 2225/09; A63B 1/00; A63B
2210/50; A63B 2210/56; A63B 21/4029;
A63B 2210/06; A63B 2220/52; A63B
2225/093; A63B 2225/105; A63B
2225/15; A63B 2225/20; A63B 2225/50;
A63B 2225/74; G08B 13/24; G06K 7/10
USPC .................................................. 340/5.7, 5.71
See application file for complete search history.

(56) References Cited

U.S. PATENT DOCUMENTS

| | | | |
|---|---|---|---|
| 10,960,256 B2* | 3/2021 | Donnelly | A63B 21/4029 |
| 11,072,464 B2* | 7/2021 | Freedman | A45C 11/20 |
| 11,130,022 B1* | 9/2021 | LoDuca | A63B 24/0087 |
| 11,546,525 B2* | 1/2023 | Bashkin | A47B 81/00 |
| 11,865,403 B2* | 1/2024 | Magrella | A63B 71/0036 |
| 12,201,736 B2* | 1/2025 | Lentvorski | H02J 50/80 |
| 2008/0179214 A1* | 7/2008 | Hall | A63B 71/0036 |
| | | | 482/4 |
| 2011/0074543 A1 | 3/2011 | Kaczmarz et al. | |
| 2019/0126122 A1* | 5/2019 | Vester | A63B 71/0036 |
| 2019/0166993 A1* | 6/2019 | Siaperas | A47B 81/00 |
| 2019/0213455 A1 | 7/2019 | Mann et al. | |

* cited by examiner

COMMON TRAINING WORKSTATION AND RELATED METHOD OF USE

TECHNICAL FIELD

The present invention relates to the field of physical training workstations, in particular to the field of common workstations for carrying out sports training independently.

BACKGROUND

It is well known to make physical workout stations available to the public, meaning freely accessible workstations in public areas such as pedestrian islands, city parks and the like. As is well known, these training workstations are set up by the public administration, or by other operators, with the dual purpose of making public areas more attractive and encouraging citizens to take part in sporting activities. In fact, it is well known that outdoor sporting activity has a significant positive effect on people's health, with excellent effects on the overall wellbeing of society and on health service management.

Common training workstations set up for this purpose must meet several requirements. First of all, they must be resistant to atmospheric agents, in particular rain and sunlight, without degrading. In addition, such equipment must be safe from the point of view of use by inexperienced people who decide to carry out the sporting activity independently, i.e. without the supervision of a qualified instructor or another experienced person. Finally, these workstations must be as tamper-proof as possible for malicious persons, so as to withstand attempts at vandalism and theft of parts. In light of all the above, common training workstations are usually very robust and simple, with few moving parts and no removable elements. Thus, common training workstations are mainly intended for free-body or callisthenic exercises and are usually limited to poles, wall bars, pull-up and push-up bars, adjustable supports and the like.

Although widely appreciated, common training workstations of the known type are not without disadvantages. They do not allow a full range of exercises to be performed, as they exclude all exercises requiring the use of removable sports equipment such as weights, dumbbells, barbells, kettlebells, ropes, elastic bands and the like.

There is therefore a perceived need for common training workstations that allow a full range of exercises to be carried out.

SUMMARY

An object of the present invention is to overcome the drawbacks of the prior art.

In particular, a task of the present invention is to provide a common training workstation that enables removable sports equipment to be made safely available to the public.

Furthermore, a task of the present invention is to provide a common training workstation configured to ensure that, at the end of each training session of a user, another user can access a training session of their own, without the need for a reset intervention by the operator.

Furthermore, a task of the present invention is to make available a system for managing the common training workstation.

These and other purposes and tasks of the present invention are achieved by means of a common sports equipment and a related management system incorporating the features of the appended claims, which form an integral part of the present description.

In accordance with a first aspect, the invention relates to a common training workstation comprising:
  one or more removable sports equipment;
  a cabinet equipped with a door and housings for the removable sports equipment;
  an electronic lock capable of opening/closing the door of the cabinet in response to an opening/closing command;
  a control unit operatively connected to the electronic lock to send the opening command in response to a request for access by a user; and
  a plurality of sensors adapted to detect the presence of removable sports equipment within the respective housings.

In the training workstation of the invention, the control unit is configured to send the closing command to the electronic lock only in case the control unit has received an exit request from the user and each of the sensors detects the presence of the respective removable sport equipment within the respective housing.

Preferably the training workstation also includes a connection module for access to a data network.

Preferably the training workstation also includes an I/O interface. The I/O interface may include, for example, one or more of: a display, a keyboard, a numeric keypad, a touch screen, an optical scanner, a short distance wireless communication module.

Preferably, the training workstation also comprises a bench movable between a rest position and a use position.

Preferably when the bench is in the rest position it is at least partially accommodated within the cabinet.

Preferably the training workstation also includes a sanitizing circuit set up inside the cabinet.

In accordance with a second aspect, the invention relates to a management system comprising one or more common training workstations in accordance with the foregoing, and a server of an operator of the training workstations, wherein the server is remotely accessible via a data network.

Preferably, the management system further comprises a mobile device of a training workstation user.

Preferably the management system further comprises a data network connection allowing access to the operator's server. The connection to the data network can be provided by a training workstation connection module, the user's mobile device or both.

In accordance with a second aspect, the invention relates to a method for using a common training workstation. The method comprises the steps of:
  providing a training workstation in accordance with the foregoing;
  providing a server of the operator of the training workstation, accessible through a data network;
  providing a connection to the data network allowing remote access to the operator's server;
  sending the operator's server a request for accessing the training workstation;
  verifying that an authorization level of a user permits access to the training workstation;
  sending an opening consent signal;
  sending an opening command to the electronic lock;
  accessing inside the cabinet;
  removing at least one removable sport equipment from the respective housing;

putting all the removable sport equipment back in the respective housings;

generating an exit request for exiting the session;

verifying that each of the sensors of the cabinet properly detects the presence of the respective removable sport equipment;

sending a closing command to the electronic lock; and generating a successful locking code for the operator's server.

Further features and advantages of the present invention will be more evident from the description of the accompanying drawings.

BRIEF DESCRIPTION OF THE DRAWINGS

The invention is described hereinbelow with reference to certain examples provided by way of non-limiting example and illustrated in the accompanying drawings. These drawings illustrate different aspects and embodiments of the present invention and reference numerals illustrating structures, components, materials and/or similar elements in different drawings are indicated by similar reference numerals, where appropriate. Moreover, for clarity of illustration, certain references may not be repeated in all drawings.

DETAILED DESCRIPTION OF EMBODIMENTS

While the invention is susceptible to various modifications and alternative constructions, certain preferred embodiments are shown in the drawings and are described hereinbelow in detail. It must in any case be understood that there is no intention to limit the invention to the specific embodiment illustrated, but, on the contrary, the invention intends covering all the modifications, alternative and equivalent constructions that fall within the scope of the invention as defined in the claims.

The use of "for example", "etc.", "or" indicates non-exclusive alternatives without limitation, unless otherwise indicated. The use of "comprises" and "includes" means "comprises or includes, but not limited to", unless otherwise indicated.

The invention is intended to be used in the presence of acceleration of gravity g. In the following discussion, it is understood that the acceleration of gravity g unambiguously defines the vertical direction and, consequently, the horizontal directions. Furthermore, the terms "high", "above", "upper" and the like are considered to be uniquely defined in relation to the terms "low", "below", "lower" and the like, based on the acceleration of gravity g.

In accordance with a first aspect, the invention relates to a common workstation for physical training, indicated by 20 in the appended figures. The training workstation 20 in accordance with the invention comprises:

one or more removable sports equipment 22;

a cabinet 24 equipped with a door 26 and housings 28 for the removable sports equipment 22;

an electronic lock 30 capable of opening/closing the door 26 of the cabinet 24 in response to an opening/closing command;

a control unit 32 operatively connected to the electronic lock 30 to send the opening command in response to a request for access by a user; and a plurality of sensors 34 adapted to detect the presence of removable sports equipment 22 within the respective housings 28.

In the training workstation 20 of the invention, the control unit 32 is configured to send the closing command to the electronic lock 30 only in case the control unit 32 has received an exit request from the user and each of the sensors 34 detects the presence of the respective removable sport equipment 22 within the respective housing 28.

Removable sports equipment 22 may for example include weights, dumbbells 22.a, barbells 22.b, discs 22.c, kettle-bells, ropes, springs, elastic bands, mats 22.d, sticks, and the like. Preferably, for each of the removable sports equipment 22 a specific housing 28 is provided arranged with a sensor 34 adapted to detect the presence of the respective removable sports equipment 22.

The sensors 34 can take different shapes, known per se, to meet specific needs. For example, sensors 34 can be chosen from the group comprising: magnetic sensors 34.a, limit switch sensors 34.b, proximity sensors, optical sensors, weight-sensitive sensors. The magnetic sensors 34.a are adapted to detect a predetermined magnetic field, typically the magnetic field generated by a magnet 34.a' supplied with the magnetic sensor 34.a and arranged on the object to be detected. Limit switches 34.b include a microswitch adapted to open/close a circuit following contact with the object to be detected. Proximity sensors are suitable for detecting the presence of an object within a predefined distance, without the need for actual contact between the object and the sensor. The operation of proximity sensors can exploit different phenomena; for example, inductive or capacitive proximity sensors can be used to detect metal objects. Other proximity sensors are optical or ultrasonic. Each sensor 34 may be selected to meet the specific needs posed by the type of removable sports equipment 22 with which it is associated and/or the type of housing 28 in which it is provided.

By way of example, two different possible embodiments of housings 28 and two different sensors 34 are described below.

Figure 1:
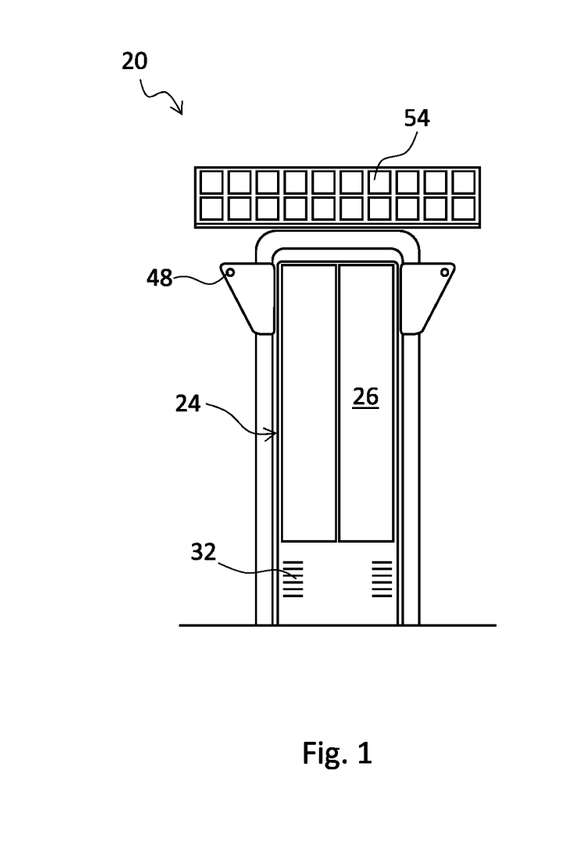
FIG. 1 is a front schematic view of a common training workstation in accordance with the invention in a closed configuration.
Figure 2:
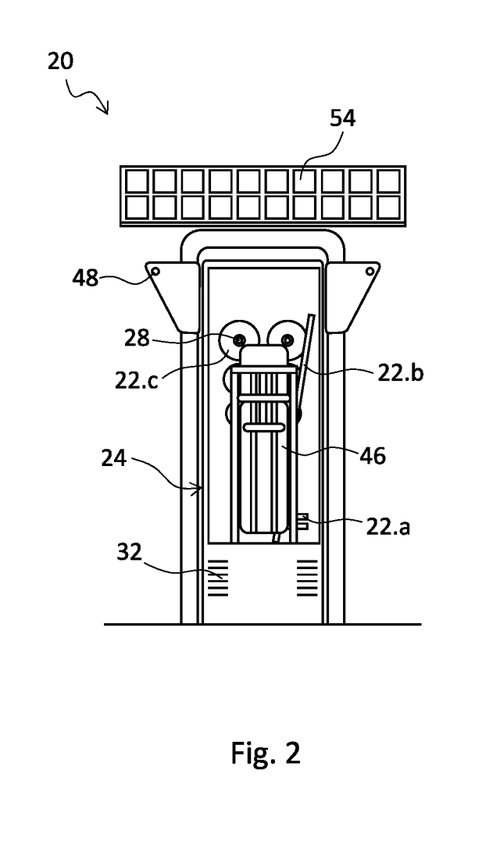
FIG. 2 is a front schematic view of the workstation in FIG. 1 in an open configuration.
Figure 3:
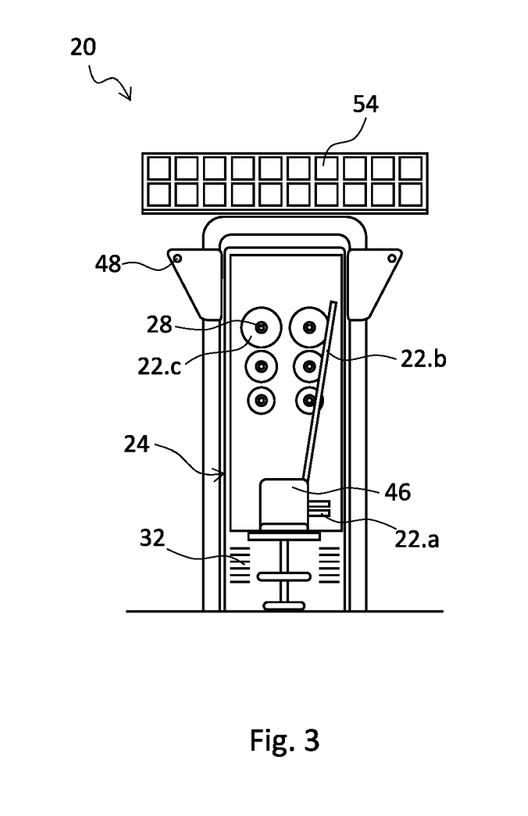
FIG. 3 is a front schematic view of the workstation in FIG. 1 in a use configuration.
Figure 4:
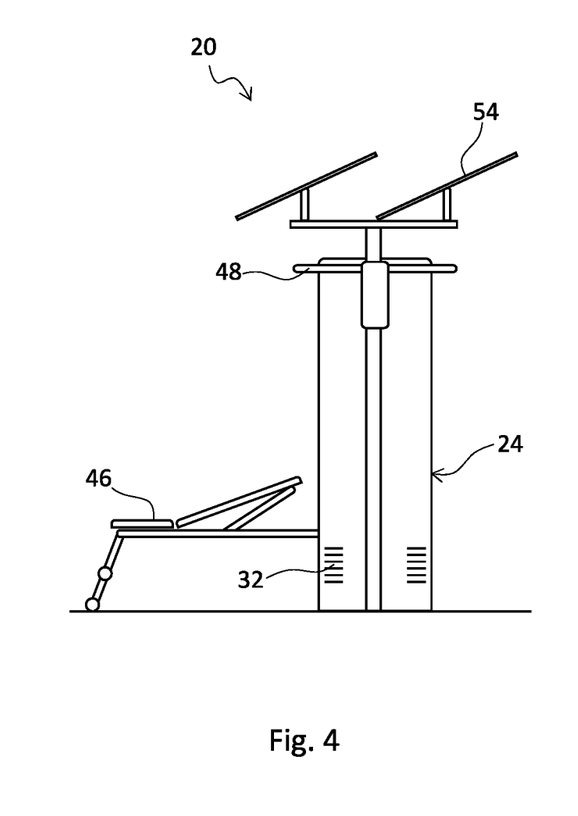
FIG. 4 is a side schematic view of the workstation in FIG. 1 in a use configuration.
Figure 5:
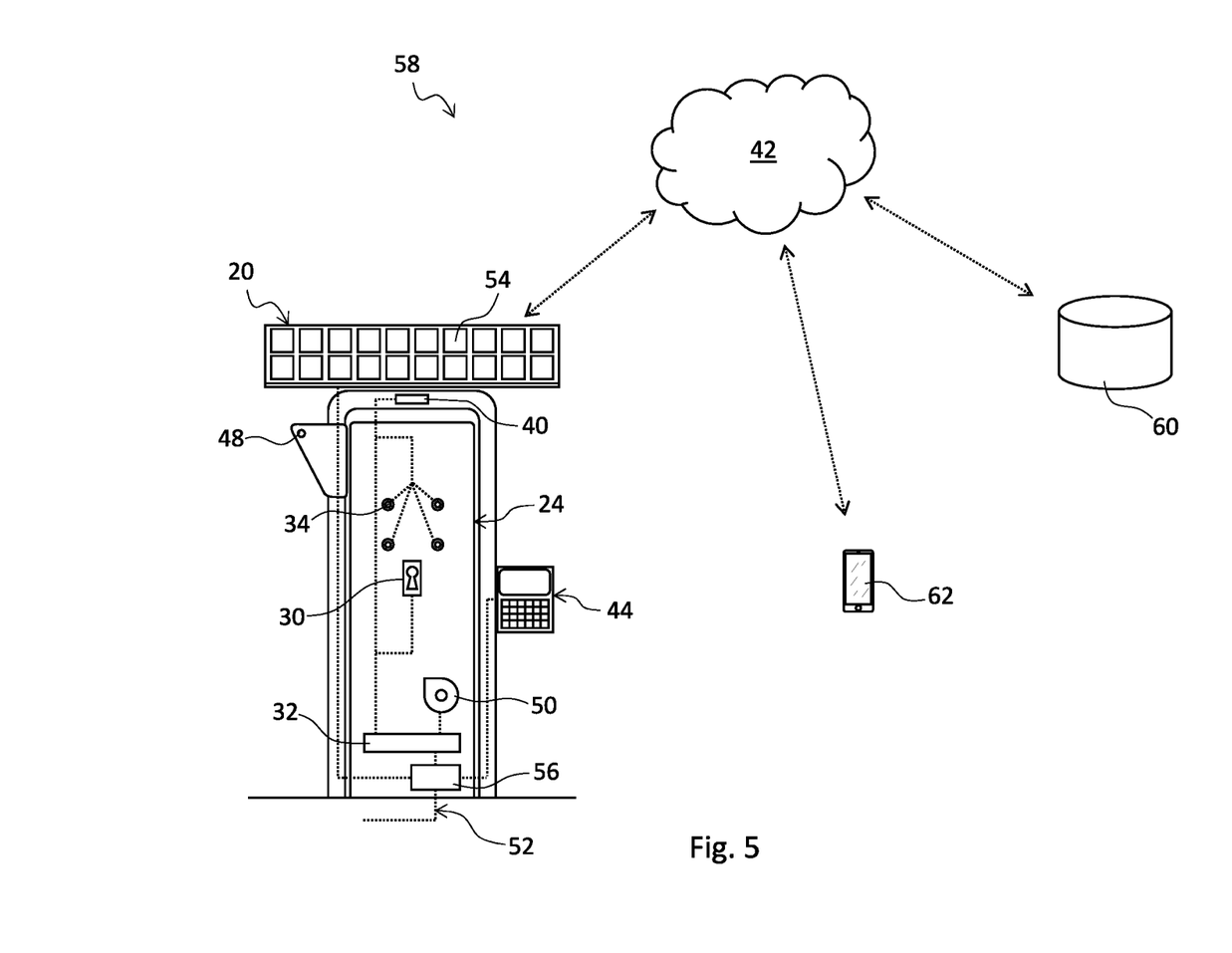
FIG. 5 is a schematic view of a management system in accordance with the invention.
Figure 6:
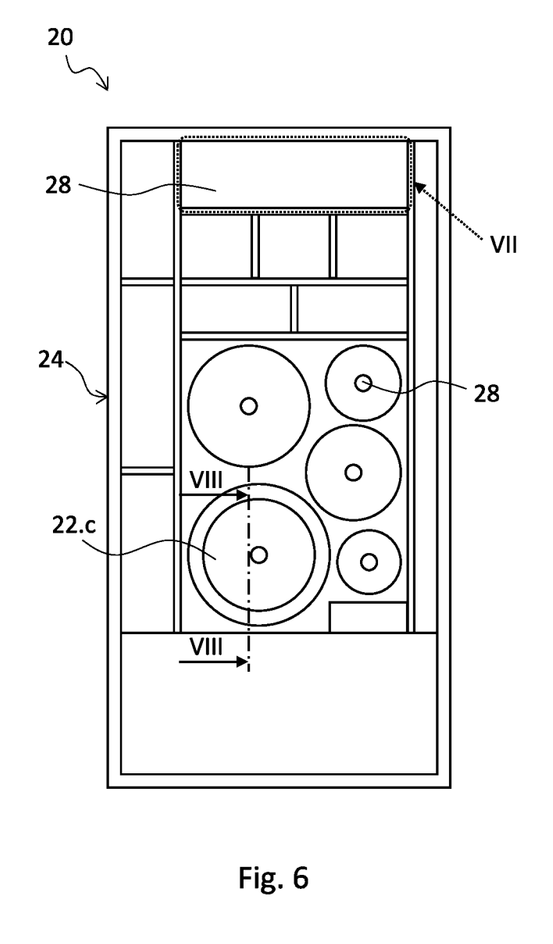
FIG. 6 is a front schematic view of another common training workstation in accordance with the invention in an open configuration.
Figure 7:
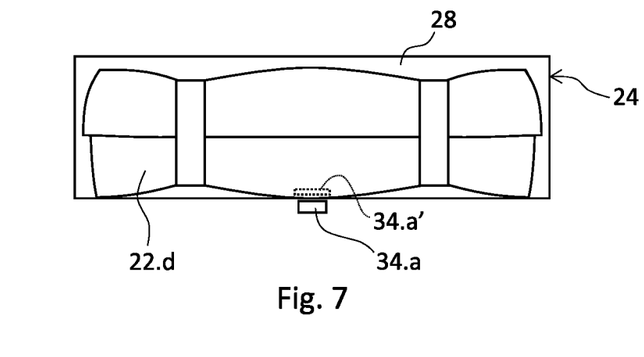
FIG. 7 is an enlarged view of the detail shown with VII in FIG. 6, in a use configuration.

With reference to FIG. 7, a housing 28 specifically provided for a mat 22.d is described below. The housing 28 is shaped to accommodate the mat 22.d in a predefined configuration, for example rolled up. The housing 28 is provided with a magnetic sensor 34.a, in particular comprised in the wall of the housing 28. A magnet 34.a' adapted to be detected by the magnetic sensor 34.a is provided on the mat 22.d. In particular, the magnet 34.a' is provided on the mat 22.d so that, when the latter is arranged in the default configuration within the housing 28, the magnet 34.a' is in close proximity to the magnetic sensor 34.a. If more than one configuration is recognized as valid for the mat 22.d, then more than one magnet 34.a' may be arranged, so that in each of the valid configurations a magnet 34.a' is located in proximity to the sensor 34. For example, in the case of the mat 22.d, it can be rolled up either in one direction or in the opposite direction without affecting its integrity. In such a case, therefore, it is possible to place two magnets 34.a' in different positions on the mat 22.d, so that in each of the two positions one magnet 34.a' is in proximity to the magnetic sensor 34.a, while the other magnet 34.a' is far from it. In this way, the magnetic sensor 34.a is able to correctly detect the mat 22.d in each of the two valid configurations.

Preferably, both the magnetic sensor 34.a and the magnet 34.a' are arranged to conceal their exact position. For example, the magnetic sensor 34.a may be embedded in the thickness of the wall of the housing 28 and the magnet 34.a' may be embedded in the thickness of the mat 22.d.

A similar solution can also be adopted for other removable sports equipment 22, in particular that which is relatively light and/or made of non-metallic materials such as ropes, elastic bands, sticks and the like.

Figure 8:
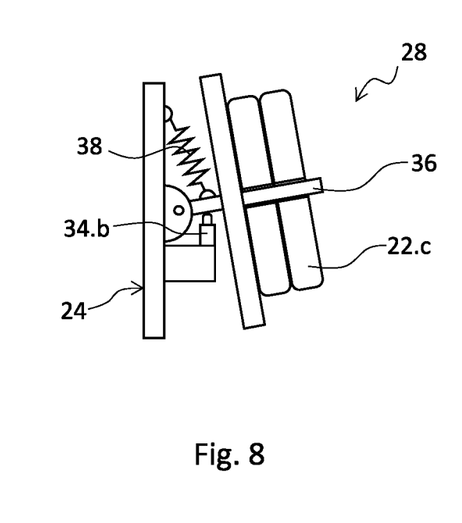
FIG. 8 is a schematic view of the section operated along trace VIII-VIII in FIG. 6, in a use configuration.

With reference to FIG. 8, a housing 28 specifically provided for one or more 22.c. disks is described below. The housing 28 comprises a peg 36 intended to receive the disks 22.c and movable between an unloaded and a loaded position and vice versa. Thrust means 38 tend to bring the peg 36 into the unloaded position, whereas a limit switch 34.b is arranged to detect the peg 36 when it reaches the loaded position. In the specific embodiment shown in FIG. 8, the peg 36 is configured to move from the unloaded position to the loaded position by means of a small rotation about an axis of rotation; in the following description, reference is therefore made to the moments relative to this axis of rotation generated by the forces acting on the peg 36. The thrust means 38 comprise a spring sized to generate a moment (anticlockwise in FIG. 8) which tends to keep the peg 36 in the unloaded position. When the disks 22.c intended for peg 36 are correctly accommodated thereon, their weight generates an opposite moment (clockwise in FIG. 8) which tends to bring the peg 36 into the loaded position. As the spring is designed to generate a slightly lower moment than the one generated by the disks 22.c, when the disks 22.c are correctly housed on the peg 36 the latter reaches the loaded position and activates the limit switch 34.b.

A solution similar to FIG. 8 may also be adopted for other removable sports equipment 22, in particular for equipment that is relatively heavy and/or made of metal material such as weights, dumbbells 22.a, barbells 22.b, kettlebells, and the like.

In the light of the above description, a person skilled in the art can easily understand how housings 28 can have other shapes. For example, a cradle (not shown in the figures) may be provided in place of the peg 36, on which disks 22.c or other relatively heavy removable sports equipment 22 may be placed. In addition, instead of the kinematics described above, which define a rotational movement, it is possible to set up different kinematics defining a translation movement to move from the unloaded position to the loaded position and vice versa.

In accordance with some embodiments of the invention, the training workstation 20 further comprises a connection module 40 for accessing a data network 42, for example a wired data network, a mobile telephone network or a landline telephone network.

In accordance with some embodiments of the invention, the training workstation 20 further comprises an I/O interface 44 (input/output interface), preferably arranged outside the cabinet 24 so as to be reachable even when the door 26 of the cabinet 24 is closed. By way of example, the I/O interface 44 may comprise one or more of: a display, a keyboard, a numeric keypad, a touch screen, an optical scanner. Furthermore, the I/O interface 44 may include a short-distance wireless communication module (such as Bluetooth®) to exchange data with a mobile device 62.

In accordance with some embodiments of the invention, the electronic lock 30 and/or the door 26 of the cabinet 24 comprise sensors operatively connected to the control unit 32 and configured to be able to detect the respective open/closed state. In this way, the control unit 32 is able to consider instant by instant whether the electronic lock 30 and/or the door 26 of the cabinet 24 are open or closed.

Preferably, in addition to the housings 28 for removable sports equipment 22, the training workstation 20 also comprises other sports equipment. Advantageously, the training workstation 20 includes a bench 46 of the type commonly used in gyms, e.g. for weight training. The bench 46 is preferably movable between a rest position and a use position. Advantageously, when the bench 46 is in the rest position, it can be at least partially accommodated within the cabinet 24, so as to remain protected by the door 26 during periods when it is not in use. Equally advantageously, when the bench 46 is in the use position, it can assume various configurations. For example, in a manner known per se, it is advantageous for the user to be able to adjust the seat height of the bench 46 and/or the inclination of the backrest of the bench 46, in order to best adapt the bench 46 to his or her needs, biometric measurements and to the exercise to be performed.

In accordance with some embodiments, the training workstation 20 also includes machines for targeted and guided exercises. These machines, known per se, use levers and pulleys to transform the vertical movement of lifting weights into other specific movements for training particular muscle groups. Usually the load to be lifted can be varied according to the user's needs. In some embodiments, such machines are at least partially housed within the cabinet 24, while in other embodiments they are arranged externally.

In accordance with some embodiments, the training workstation 20 also comprises fixed equipment 48 intended for the performance of free-body or callisthenic exercises. Such fixed equipment 48 can be chosen from the group comprising: poles, wall bars, bars for pull-ups and dips, adjustable supports and the like. In some embodiments, such fixed equipment 48 is at least partially housed within the cabinet 24, while in other embodiments it is arranged externally.

In accordance with some embodiments, the training workstation 20 also comprises sensors 34 adapted to detect the use of the bench 46, machines and/or fixed equipment 48. Such sensors 34 may be quite similar to those described above in relation to housings 28.

In accordance with a preferred embodiment, a sanitizing circuit 50 operatively connected to the control unit 32 and adapted to guarantee the hygiene of the removable sports equipment 22 contained within the cabinet 24 is provided within the cabinet 24. By way of example, the sanitizing circuit 50 may comprise a dispenser configured to dispense a predefined amount of a sanitizing agent and possibly a fan adapted to promote circulation of the sanitizing agent within the cabinet 24. Preferably, at the end of each training session, when the door 26 is properly closed, the control unit 32 commands a sanitizing cycle involving everything contained within the cabinet 24: the removable sports equipment 22, and possibly the bench 46, the machines and fixed equipment 48. Preferably, the control unit 32 is configured to deny access to the cabinet 24 during the sanitizing cycle.

In accordance with a preferred embodiment, the training workstation 20 may comprise one or more courtesy lights, adapted to assist the user in poor ambient light conditions.

Preferably, the training workstation 20 comprises a power supply circuit 52 adapted to supply electrical power to all utilities arranged in the training workstation 20. The utilities that may require power from the power supply circuit 52 may be one or more of: the control unit 32, the electronic lock 30, the sensors 34, the connection module 40, the I/O interface 44, the sanitizing circuit 50, the courtesy lights. Preferably the power supply circuit 52 is connected to an electrical supply network. Additionally or alternatively, the power supply circuit 52 of the training workstation 20 may comprise a photovoltaic solar panel 54 and/or a battery 56. Preferably, the battery 56 is adapted to guarantee the proper operation of the training workstation 20 even in the absence of other energy sources, for example in the absence of voltage in the electrical supply network and/or in the absence of adequate solar radiation on the photovoltaic solar panel 54.

In accordance with a second aspect, the invention relates to a management system 58 which comprises one or more training workstations 20 in accordance with the foregoing, and a server 60 of an operator of the training workstations 20, wherein the server 60 is remotely accessible via a data network 42.

In accordance with some embodiments of the invention, the management system 58 further comprises a mobile device 62 in use by a user of a training workstation 20.

The management system 58 in accordance with the invention further comprises a connection to the data network 42 allowing access to the operator's server 60. This connection, depending on the different embodiments, may be provided by a connection module 40 of a training workstation 20, by the user's mobile device 62 or by both.

In the event that the management system 58 comprises a plurality of training workstations 20 of the same operator, the connection to the data network 42 may be obtained in different forms. In accordance with a first possibility, each of the training workstations 20 comprises its own connection module 40 for accessing the data network 42, through which it can access the server 60 independently from the other training workstations 20. In accordance with another solution, which is particularly useful in the case where there is a plurality of training workstations 20 arranged at a short distance from one other, it is possible to provide the connection module 40 to the data network 42 on a single workstation (called a hub workstation) and then set up a local network through which the other training workstations 20 can communicate with the hub workstation. In this way, each of the training workstations 20 can access the server 60 via the hub workstation. The local area network may include short-range wireless and/or wired connections.

Figure 9:
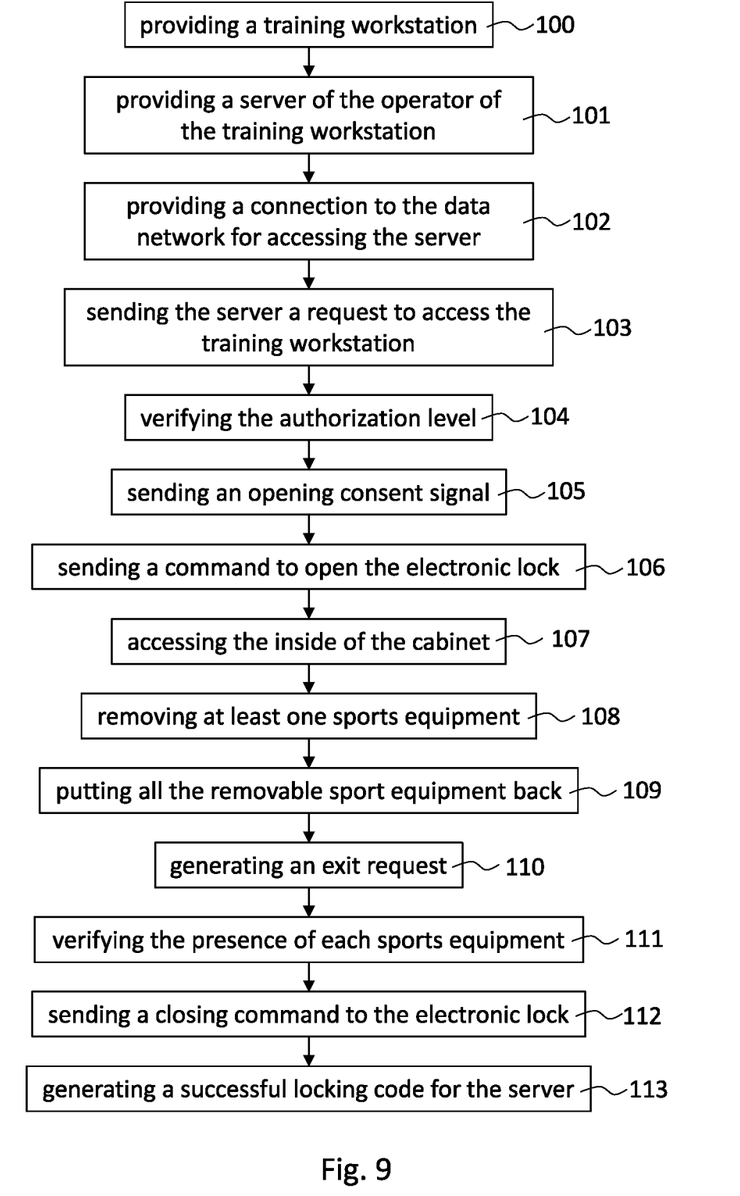
FIG. 9 schematically shows a flow chart of the method for using the system in FIG. 5.

In accordance with a third aspect, the invention relates to a method for use of the management system 58 in accordance with the invention by a user. In its general form, with particular reference to FIG. 9, the method comprises the following steps:

providing a training workstation 20 in accordance with the foregoing (block 100);
providing a server 60 of the operator of the training workstation 20, accessible through a data network 42 (block 101);
providing a connection to a data network 42 allowing remote access to the operator's server 60 (block 102);
sending the operator's server 60 a request for accessing the training workstation 20 (block 103);
verifying that an authorization level of a user permits access to the training workstation 20 (block 104);
sending an opening consent signal (block 105);
sending an opening command to the electronic lock 30 (block 106);
accessing the inside of the cabinet 24 (block 107);
removing at least one removable sport equipment 22 from the respective housing 28 (block 108);
putting all the removable sport equipment 22 back in the respective housings 28 (block 109);
generating an exit request for exiting the session (block 110);
verifying that each of the sensors 34 of the cabinet 24 properly detects the presence of the respective removable sport equipment 22 (block 111);
sending a closing command to the electronic lock 30 (block 112); and
generating a successful locking code for the operator's server 60 (block 113).

Some embodiments of the method in accordance with the invention are described in more detail below.

Preferably, in the preliminary stages, the operator sets up the management system 58 comprising one or more training workstations 20 (block 100 in FIG. 9) and a server 60 accessible remotely via a data network 42 (block 101). A connection to the data network 42 must also be provided to enable access to server 60 (block 102).

Preferably, in the preliminary stages, the user must obtain permission to use the training workstation 20 from the training workstation operator. This preliminary step may for example include one or more of the following sub-steps:

providing the operator with some personal data in order to generate a user profile;
providing the operator with a medical certificate;
paying a membership fee;
paying an insurance fee;
choosing specific days and/or specific time slots for training sessions.

In a preliminary step, therefore, the operator compiles and maintains on its server 60 a register of users, each of whom is associated with an authorization, possibly differentiated according to various parameters. The server 60 can be accessed remotely via the data network 42.

Preferably the management system 58 may include a plurality of training workstations 20. For example, many identical training workstations 20 may be scattered across one or more equipped areas such as parks or the like; in addition or alternatively, different training workstations 20 intended for different training may be provided within a single equipped area, for example along a predetermined route.

When the user wants to start a training session, he sends a request to the operator's server 60 for access to a specific training location 20 (block 103). On receiving the access request, the server 60 verifies that the user's authorization level actually allows him/her access to that training workstation 20 at that specific time (block 104). If this is not the case, the server 60 may preferably notify the user of the reason why he/she is not allowed access. If so, the server 60 sends an opening consent signal (block 105). The control unit 32 of the training workstation 20, upon receiving the opening consent signal, sends an opening command to the electronic lock 30 (block 106), which opens by unlocking the door 26. The user can thus access the inside of the cabinet 24 (block 107) and remove one or more of the removable sports equipment 22 (block 108) to proceed with the training session.

At the end of the training session, the user places all the removable sports equipment 22 back into their respective housings 28 (block 109) and generates a request to exit the session (block 110). In response to an exit request, the control unit 32 checks that each of the sensors 34 provided in the cabinet 24 correctly detects the presence of the respective removable sports equipment 22 (block 111). If so, the control unit 32 sends a closing command to the electronic lock 30 (lock 112), which closes and locks the door 26 again. In addition, the control unit 32 generates a successful locking code for the server 60 (block 113). Otherwise, i.e. if at least one of the sensors 34 does not correctly detect the presence of the respective removable sports equipment 22, the control unit 32 does not send the lock command or generate the successful locking code, but may preferably generate an alarm signal for the user and/or the server 60.

While remaining within the general scope described above, different embodiments of the method are possible to meet specific needs, some of which are described in detail below.

One possible embodiment of the method is particularly suitable in cases where only the user has access to a data network 42, typically a mobile telephone network, but also a cable data network or a landline telephone network. The user therefore has a mobile device 62 at his/her disposal, e.g. a smartwatch, smartphone, tablet or the like. In this case, the training workstation 20 has no access to the data network 42, and thus to the operator's server 60, and uses the connection offered by the user's mobile device 62. This solution makes it possible to simplify the training workstation 20 while limiting its implementation and management costs.

In this case, when the user wants to start a training session, he/she approaches the training workstation 20 and sends an access request to the operator's server 60 via his/her mobile device 62. On receiving the access request, the server 60 verifies that the user's authorization level actually allows him/her access to that training workstation 20 at that specific time. If so, the server 60 sends the user's mobile device 62 an opening consent signal, for example in the form of an opening code. The user then provides the opening code to the control unit 32 of the training workstation 20 via an appropriate I/O interface 44. For example, if the opening code received from the mobile device 62 has a graphic form (such as a barcode or QR code) the I/O interface 44 includes an optical scanner adapted to read the code in graphic form. On the other hand, if the opening code is in the form of a string of characters, the I/O interface 44 includes a keyboard, numeric keypad, touch screen or the like. The control unit 32 of the training workstation 20, having received the opening code, assesses its validity on the basis of a logic preloaded by the operator. If the opening code is valid, it is interpreted as an opening consent signal and the control unit 32 sends an opening command to the electronic lock 30. The user can then access the inside of the cabinet 24 where the removable sports equipment 22 is stored and can then proceed with the training session.

At the end of the training session, the user places all the removable sports equipment 22 back into their respective housings 28 and generates a request to exit the session. Several modes are possible for generating the request to exit the session, for example through the I/O interface 44 or simply by pushing the door 26 of the cabinet 24. Upon receiving the request to exit the session, the control unit 32 checks that each of the sensors 34 provided in the cabinet 24 correctly detects the presence of the respective removable sports equipment 22. If so, the control unit 32 sends a locking command to the electronic lock 30 and generates a successful locking code which is displayed for the user. The user sends the locking code via his/her mobile device 62 to the operator's server 60, which assesses the validity of the locking code on the basis of preloaded logic. If the successful locking code is valid, server 60 records the end of the training session. Conversely, if at least one of the sensors 34 does not correctly detect the presence of the respective removable sporting equipment 22, the control unit 32 does not send the locking command to the electronic lock 30 or provide any successful locking code. In this case, the control unit 32 may preferably generate an alarm signal to warn the user of the failure to close. In turn, the operator's server 60 continues to keep the training session open as it does not receive a successful locking code. After a predefined time, the server 60 may preferably generate an alarm signal to be sent to the user's mobile device 62 to warn of the failure to close.

Another possible embodiment of the method is particularly suitable in cases where only the training workstation 20 has access to a data network 42, e.g. a cable data network, a mobile telephone network or a landline telephone network. In this case, the user has no access to the operator's own data network 42 and thus to the server 60 and uses the connection offered by the training workstation 20. This solution allows the user to move around without carrying relatively bulky electronic devices that can be a nuisance, for example during a warm-up run used to reach the workstation.

In such a case, when the user wants to start a training session, he/she approaches a training workstation 20 and, via an I/O interface 44 provided outside the training workstation 20, sends a request for access to the session to the operator's server 60. When requesting access, the user should preferably identify him/herself by a method agreed with the operator, such as by means of a Personal Identification Number (PIN), RFID token or wristband, magnetic card, or other unique identification method. On receiving the access request, the server 60 verifies that the user's authorization level actually allows him/her access to that training workstation 20 at that specific time. If so, the server 60 sends an opening consent signal to the control unit 32 of the training workstation 20, and the control unit 32 in turn sends an opening command to the electronic lock 30. The user can then access the inside of the cabinet 24 where the removable sports equipment is stored 22 and can then proceed with the training session.

At the end of the training session, the user places all the removable sports equipment 22 back into their respective housings 28 and generates a request to exit the session. The request to exit the session can be generated as described above, either via the I/O interface 44 present on the training workstation 20 or by simply pushing the door 26 of the cabinet 24. In response to an exit request, the control unit 32 checks that each of the sensors 34 provided in the cabinet 24 correctly detects the presence of the respective removable sports equipment 22. If so, the control unit 32 sends a locking command to the electronic lock 30 and sends a successful locking code to the operator's server 60. Otherwise, i.e. if at least one of the sensors 34 does not correctly detect the presence of the respective removable sports equipment 22, the control unit 32 does not send either the lock command or the successful locking code, but may preferably generate an alarm signal for the user and/or for the operator's server 60.

Other possible embodiments of the method are suitable if both the training workstation 20 and the user have access to a data network 42, for example a wired data network, a mobile telephone network or a landline telephone network.

In this case, which is the most advantageous solution, both the user and the training workstation 20 have their own access to the operator's server 60, so that the communications described above for managing the session can be delegated partly to the user's mobile device 62 and partly to the training workstation 20. Furthermore, in this case it is possible to provide that at least some communication steps are redundant (i.e. are carried out both by the user's mobile device 62 and by the training workstation 20), for example for greater security and/or for greater control by the operator.

In this case, when the user wants to start a training session, he/she approaches the training workstation 20 and sends an access request to the operator's server 60 via his/her mobile device 62. On receiving the access request, the server 60 verifies that the user's authorization level actually allows him/her access to that training workstation 20 at that specific time. If so, the server 60 sends an opening consent signal to the control unit 32 of the training workstation 20, and the control unit 32 in turn sends an opening command to the electronic lock 30. The user can then access the inside of the cabinet 24 where the removable sports equipment 22 is stored and can then proceed with the training session.

At the end of the training session, the user places all the removable sports equipment 22 back into their respective housings 28 and generates a request to exit the session. The request to exit the session may be generated via the mobile device 62 or, as described above, via an I/O interface 44 present on the training workstation 20 or by simply pushing the door 26 of the cabinet 24. In response to an exit request, the control unit 32 checks that each of the sensors 34 provided in the cabinet 24 correctly detects the presence of the respective removable sports equipment 22. If so, the control unit 32 sends a locking command to the electronic lock 30 and sends a successful locking code to the operator's server 60. Otherwise, i.e. if at least one of the sensors 34 does not correctly detect the presence of the respective removable sports equipment 22, the control unit 32 does not send either the lock command or the successful locking code, but may preferably generate an alarm signal for the user and/or for the operator's server 60.

The methods described above imply that the user who wants to start a training session sends the operator a request for access to a specific training workstation 20. Accordingly, where the same operator operates a plurality of training workstations 20, each specific training workstation 20 must be uniquely identified in the communication between the user and the server 60. If the user sends the access request via the same training workstation 20, it automatically identifies itself at the server 60. If, on the other hand, the user has to send the access request via his/her mobile device 62, the training workstation 20 can be identified at the server 60 by means of an identification code to be entered, a QR code or a barcode to be scanned, by means of geolocation of the user's mobile device 62 or even by means of a short-range wireless connection (for example by exploiting Bluetooth® technology) between the mobile device 62 and the training workstation 20 itself.

As a person skilled in the art can clearly understand, between the step in which the control unit 32 sends the locking command to the electronic lock 30 and the step in which it generates the successful locking code for the server 60, an intermediate step for checking the successful locking is preferably provided. In particular, it is preferred that the electronic lock 30 and/or the door 26 of the cabinet 24 include sensors 34 configured to be able to detect the respective open/closed status. In case something prevents the actual closing of the cabinet 24, despite the closing command to the electronic lock 30 the control unit 32 does not generate any successful locking code, but preferably generates an alarm signal for the user and/or for the server 60.

Within the scope of the method of the invention, the operator's server 60 may charge the user according to different parameters. For example, it can apply a pay-as-you-go tariff proportionate to the time between sending the opening code and receiving the successful locking code. In this case, the failure to close the cabinet 24 results in a progressive increase in the tariff to be paid by the user. Alternatively or additionally, the tariff can consider in detail what and how much equipment was used, as the sensors 34 provided in the cabinet 24 are able to track the use of each of the removable sports equipment 22. Other similar sensors 34 can detect the use of the bench 46, machines and/or fixed equipment 48.

As a person skilled in the art can clearly understand, the invention overcomes the disadvantages highlighted above in relation to the known technique.

In particular, the invention provides a common training workstation 20 that allows removable sports equipment 22 to be made safely available to the public.

Furthermore, the invention provides a common training workstation 20 configured to ensure that, at the end of each training session of a user, another user can access a training session of their own, without the need for a reset intervention by the operator.

In addition, the invention makes available a system for managing the common training workstation 20.

Moreover, all the details can be replaced by other technically equivalent elements.

In practice, the materials used, as well as the contingent shapes and sizes, can be whatever according to the requirements without for this reason departing from the scope of protection of the following claims.

The invention claimed is:

1. A training workstation, comprising:
    one or more removable sports equipment;
    a cabinet equipped with a door and housings for the removable sports equipment;
    an electronic lock configured for opening/closing the door of the cabinet in response to an opening/closing command;
    a control unit operatively connected to the electronic lock to send the opening command in response to a request for access by a user; and
    a plurality of sensors configured to detect the presence of removable sports equipment within the respective housings;
    wherein the control unit is configured to send the closing command to the electronic lock only in case the control unit has received an exit request from the user and each of the sensors detects the presence of the respective removable sport equipment within the respective housing.

2. The training workstation according to claim 1, further comprising a connection module for access to a data network.

3. The training workstation according to claim 1, further comprising an input/output interface comprising at least one of: a display, a keyboard, a numeric keypad, a touch screen, an optical scanner, and a short distance wireless communication module.

4. Training workstation according to claim 1, further comprising a bench movable between a rest position and a use position.

5. The training workstation according to claim 4, wherein when the bench is in the rest position, it is at least partially housed inside the cabinet.

6. The training workstation according to one claim 1, further comprising a sanitizing circuit provided inside the cabinet.

7. A management system, comprising one or more training workstations according to one claim 1, and a server of an operator of the training workstations, wherein the server is configured to be remotely accessed through a data network.

8. The management system according to claim 7, further comprising a mobile device of a user of a training workstation.

9. The management system according to claim 7, further comprising a connection to the data network providing the access to the server of the operator, wherein the connection to the data network is provided by a connection module of a training workstation, by the mobile device of the user, or by both.

10. A method for using a training workstation, comprising:
   providing the training workstation according to claim 1;
   providing a server of the operator of the training workstation, accessible through a data network;
   providing a connection to the data network allowing remote access to the server of the operator;
   sending the operator's server a request for accessing the training workstation;
   verifying that an authorization level of a user permits access to the training workstation;
   sending an opening consent signal;
   sending an opening command to the electronic lock;
   accessing the inside of the cabinet;
   removing at least one removable sport equipment from the respective housing;
   putting all the removable sport equipment back in the respective housings;
   generating an exit request for exiting the session;
   verifying that each of the sensors of the cabinet properly detects the presence of the respective removable sport equipment;
   sending a closing command to the electronic lock; and
   generating a successful locking code for the operator's server.

* * * * *